(12) United States Patent
Chen et al.

(10) Patent No.: US 11,605,118 B2
(45) Date of Patent: Mar. 14, 2023

(54) SYSTEMS AND METHODS FOR NEXT BASKET RECOMMENDATION WITH DYNAMIC ATTRIBUTES MODELING

(71) Applicant: salesforce.com, inc., San Francisco, CA (US)

(72) Inventors: Yongjun Chen, Palo Alto, CA (US); Jia Li, Mountain View, CA (US); Chenxi Li, Belmont, CA (US); Markus Anderle, Moraga, CA (US); Caiming Xiong, Menlo Park, CA (US); Simo Arajarvi, Dublin, CA (US); Harshavardhan Utharavalli, Hyderabad (IN)

(73) Assignee: salesforce.com, inc., San Francisco, CA (US)

( * ) Notice: Subject to any disclaimer, the term of this patent is extended or adjusted under 35 U.S.C. 154(b) by 40 days.

(21) Appl. No.: 17/112,765

(22) Filed: Dec. 4, 2020

(65) Prior Publication Data
US 2022/0058714 A1 Feb. 24, 2022

(30) Foreign Application Priority Data
Aug. 18, 2020 (IN) .............................. 202041035500

(51) Int. Cl.
*G06Q 30/00* (2012.01)
*G06Q 30/0601* (2023.01)
(Continued)

(52) U.S. Cl.
CPC ....... *G06Q 30/0631* (2013.01); *G06N 3/0481* (2013.01); *G06N 3/08* (2013.01); *G06Q 30/0627* (2013.01)

(58) Field of Classification Search
CPC .......... G06Q 30/0601; G06Q 30/0613; G06Q 30/0623; G06Q 30/0629; G06Q 30/0631
See application file for complete search history.

(56) References Cited

U.S. PATENT DOCUMENTS

| 8,386,336 B1 * | 2/2013 | Fox ..................... G06Q 30/0631 |
| | | 705/26.7 |
| 2001/0021914 A1 * | 9/2001 | Jacobi ................ G06Q 30/0601 |
| | | 705/26.1 |

(Continued)

OTHER PUBLICATIONS

Afoudi, Yassine, Mohamed Lazaar, and Mohammed Al Achhab. "Hybrid recommendation system combined content-based filtering and collaborative prediction using artificial neural network." Simulation Modelling Practice and Theory 113 (2021): 102375. (Year: 2021).*

(Continued)

*Primary Examiner* — Christopher B Seibert
(74) *Attorney, Agent, or Firm* — Haynes and Boone LLP

(57) ABSTRACT

Embodiments described herein provide an attentive network framework that models dynamic attributes with item and feature interactions. Specifically, the attentive network framework first encodes basket item sequences and dynamic attribute sequences with time-aware padding and time/month encoding to capture the seasonal patterns (e.g. in app recommendation, outdoor activities apps are more suitable for summer time while indoor activity apps are better for winter). Then the attentive network framework applies time-level attention modules on basket items' sequences and dynamic user attributes' sequences to capture basket items to basket items and attributes to attributes temporal sequential patterns. After that, an intra-basket attentive module is used on items in each basket to capture the correlation information among items.

17 Claims, 8 Drawing Sheets

(51) Int. Cl.
    G06N 3/08      (2023.01)
    G06N 3/04      (2023.01)

(56)           References Cited

U.S. PATENT DOCUMENTS

| | | | | |
|---|---|---|---|---|
| 2009/0110089 | A1* | 4/2009 | Green | H04L 5/0037 |
| | | | | 370/329 |
| 2010/0268661 | A1* | 10/2010 | Levy | G06Q 30/02 |
| | | | | 705/347 |
| 2012/0278091 | A1* | 11/2012 | Yaseen | G06Q 30/02 |
| | | | | 705/1.1 |
| 2014/0013033 | A1* | 1/2014 | Sharon | H03M 13/05 |
| | | | | 711/103 |
| 2015/0052003 | A1* | 2/2015 | Tang | G06Q 30/0631 |
| | | | | 705/26.7 |
| 2017/0262737 | A1* | 9/2017 | Rabinovich | G06K 9/6267 |
| 2019/0205905 | A1* | 7/2019 | Raghunathan | G06N 20/20 |

OTHER PUBLICATIONS

Seo, Sungyong, et al. "Representation learning of users and items for review rating prediction using attention-based convolutional neural network." International Workshop on Machine Learning Methods for Recommender Systems. 2017. (Year: 2017).*

Bahdanau et al., "Neural machine translation by jointly learning to align and translate," arXiv preprint arXiv:1409.0473 Sep. 1, 2014, 15 pages.

Bai et al., "An attribute-aware neural attentive model for next basket recommendation," In The 41st International ACM SIGIR Conference on Research & Development in Information Retrieval, 2018, pp. 1201-1204.

Beutel et al., "Latent cross: Making use of context in recurrent recommender systems," In Proceedings of the Eleventh ACM International Conference on Web Search and Data Mining, 2018, 9 pages.

Cao et al., "Mining smartphone data for app usage prediction and recommendations: A survey," Pervasive and Mobile Computing, May 18, 2017, 62 pages.

Che et al., "Inter-Basket and Intra-Basket Adaptive Attention Network for Next Basket Recommendation," IEEE Access 7, 2019, pp. 80644-80650.

Chen et al., "Attentive collaborative filtering: Multimedia recommendation with item-and component-level attention," In Proceedings of the 40th International ACM SIGIR conference on Research and Development in Information Retrieval, 2017, 10 pages.

Chen et al., "Sca-cnn: Spatial and channel-wise attention in convolutional networks for image captioning," In Proceedings of the IEEE conference on computer vision and pattern recognition, Apr. 12, 2017, 9 pages.

Cheng et al., "Gradient boosting factorization machines," In Proceedings of the 8th ACM Conference on Recommender systems, 2014, pp. 265-272.

Cheng et al., "Wide & deep learning for recommender systems," In Proceedings of the 1st workshop on deep learning for recommender systems, Jun. 24, 2016, 4 pages.

Cho et al., "Learning phrase representations using RNN encoder-decoder for statistical machine translation," arXiv preprint arXiv:1406.1078, Sep. 3, 2014, 15 pages.

Donkers et al., "Sequential user-based recurrent neural network recommendations," In Proceedings of the Eleventh ACM Conference on Recommender Systems, Aug. 27-31, 2017, pp. 152-160.

Glorot et al., "Understanding the difficulty of training deep feedforward neural networks," In Proceedings of the thirteenth international conference on artificial intelligence and statistics, 2010, pp. 249-256.

He et al., "Fusing similarity models with markov chains for sparse sequential recommendation," In 2016 IEEE 16th International Conference on Data Mining (ICDM), IEEE, 2016, pp. 191-200.

He et al., "Neural factorization machines for sparse predictive analytics," In Proceedings of the 40th International ACM SIGIR conference on Research and Development in Information Retrieval, Aug. 16, 2017, pp. 355-364.

He et al., "Translation-based recommendation," In Proceedings of the Eleventh ACM Conference on Recommender Systems, Aug. 27-31, 2017, 9 pages.

He et al., "Vista: A visually, socially, and temporally-aware model for artistic recommendation," In Proceedings of the 10th ACM Conference on Recommender Systems, Sep. 15-19, 2016, 8 pages.

Hochreiter et al., "Long short-term memory," Neural computation 9, 8 (1997), 32 pages.

Juan et al., "Fieldaware factorization machines for CTR prediction," In Proceedings of the 10th ACM Conference on Recommender Systems, Sep. 15-19, 2016, 8 pages.

Kang et al., "Self-attentive sequential recommendation," In 2018 IEEE International Conference on Data Mining (ICDM), IEEE, Aug. 20, 2018, 10 pages.

Lam et al., "Addressing cold-start problem in recommendation systems," In Proceedings of the 2nd international conference on Ubiquitous information management and communication, 2008, pp. 208-211.

Le et al., "Correlation-sensitive nextbasket recommendation," Proceedings of the Twenty-Eighth International Joint Conference on Artificial Intelligence (IJCAI-19), 2019, 7 pages.

Le et al., Modeling contemporaneous basket sequences with twin networks for next-item recommendation, Proceedings of the Twenty-Seventh International Joint Conference on Artificial Intelligence (IJCAI-18), 2018, pp. 3414-3420.

Lian et al., "Xdeepfm: Combining explicit and implicit feature interactions for recommender systems," In Proceedings of the 24th ACM SIGKDD International Conference on Knowledge Discovery & Data Mining, Mar. 14, 2018, 9 pages.

Liu et al., "Contextaware sequential recommendation," In 2016 IEEE 16th International Conference on Data Mining (ICDM), IEEE, 2016, 6 pages.

Liu et al., "Generating Wikipedia by summarizing long sequences," arXiv preprint arXiv:1801.10198 Jan. 30, 2018, 18 pages.

Ma et al., "Hierarchical gating networks for sequential recommendation," In Proceedings of the 25th ACM SIGKDD International Conference on Knowledge Discovery & Data Mining, Jun. 21, 2019, 9 pages.

Manotumruksa et al., "A contextual attention recurrent architecture for context-aware venue recommendation," In The 41st International ACMSIGIR Conference on Research&Development in Information Retrieval, 2018, 11 pages.

Ni et al., "Modeling heart rate and activity data for personalized fitness recommendation," In The World Wide Web Conference, May 13-17, 2019, 11 pages.

Quadrana et al., "Personalizing session-based recommendations with hierarchical recurrent neural networks," In Proceedings of the Eleventh ACM Conference on Recommender Systems, Aug. 27-31, 2017, 8 pages.

Radford et al., "Improving language understanding by generative pre-training," 2018, 12 pages.

Rendle et al., "Factorizing personalized markov chains for next-basket recommendation," In Proceedings of the 19th international conference on World wide web, Apr. 26-30, 2010, 10 pages.

Rendle et al., "Fast context-aware recommendations with factorization machines," In Proceedings of the 34th international ACM SIGIR conference on Research and development in Information Retrieval, Jul. 24-28, 2011, 10 pages.

Rendle, "Factorization machines," In 2010 IEEE International Conference on Data Mining, IEEE, 2010, 6 pages.

Shaw et al., "Self-attention with relative position representations," arXiv preprint arXiv:1803.02155 Apr. 15, 2018, 5 pages.

Song et al., "Autoint: Automatic feature interaction learning via selfattentive neural networks," In Proceedings of the 28th ACM International Conference on Information and Knowledge Management, Aug. 23, 2019, 10 pages.

Sun et al., "BERT4Rec: Sequential recommendation with bidirectional encoder representations from transformer," In Proceedings of

(56) References Cited

OTHER PUBLICATIONS the 28th ACM International Conference on Information and Knowledge Management, Jul. 2019, 11 pages.

Tan et al., "Improved recurrent neural networks for session-based recommendations," In Proceedings of the 1st Workshop on Deep Learning for Recommender Systems, Sep. 15, 2016, 6 pages.

Tang et al., "Personalized top-n sequential recommendation via convolutional sequence embedding," In Proceedings of the Eleventh ACM International Conference on Web Search and Data Mining, Feb. 5-9, 2018, 9 pages.

Vaswani et al., "Attention is all you need," In Advances in neural information processing systems, 31st Conference on Neural Information Processing Systems (NIPS 2017), Long Beach, CA, USA, 2017, 15 pages.

Wang et al., "Attention-based transactional context embedding for next-item recommendation," In Thirty-Second AAAI Conference on Artificial Intelligence, 2018, pp. 2532-2539.

Wang et al., "Deep & cross network for ad click predictions," In Proceedings of the ADKDD'17, 2017, 7 pages.

Xiao et al., "Attentional factorization machines: Learning the weight of feature interactions via attention networks," arXiv preprint arXiv:1708. 04617, Aug. 15, 2017, 7 pages.

Ying et al., "Sequential recommender system based on hierarchical attention network," In IJCAI International Joint Conference on Artificial Intelligence, 2018, pp. 3926-3932.

Yu et al., "A dynamic recurrent model for next basket recommendation," In Proceedings of the 39th International ACM SIGIR conference on Research and Development in Information Retrieval, Jul. 17-21, 2016, 4 pages.

Zhang et al., "Feature-level deeper self-attention network for sequential recommendation," In Proceedings of the 28th International Joint Conference on Artificial Intelligence. AAAI Press, 2019, pp. 4320-4326.

Zheng et al., "MARS: Memory attention-aware recommender system," In 2019 IEEE International Conference on Data Science and Advanced Analytics (DSAA), IEEE, 2019, 10 pages.

Zhou et al., "Atrank: An attention-based user behavior modeling framework for recommendation," In Thirty-Second AAAI Conference on Artificial Intelligence, 2018, 9 pages.

International Search Report and Written Opinion from PCT/US2021/043703 dated Nov. 12, 2021, 21 pages.

Chen et al.: "Modeling Dynamic Attributes for Next Basket Recommendation", CARS: Workshop on Context-Aware Recommender Systems (ReeSys '21), Sep. 23, 2021 (Sep. 23, 2021), pp. 1-10, XP055856176, Retrieved from the Internet: URL:https://arxiv.org/pdf/2109.11654.pdf, [retrieved on Oct. 29, 2021].

Li, et al., "MRIF: Multi-resolution Interest Fusion for Recommendation", Proceedings of the $43^{rd}$ International ACM SIGIR Conference on Research and Development in Information Retrieval (SIGIR '20), Jul. 25-30, 2020, Virtual Events, China ACM, New York, NY, USA, 1765-1768, XP058642736.

Ren et al: "Sequential Recommendation with Self-Attentive Multi-Adversarial Network", Arxiv.Org, Cornell University Library, 201 Olin Library Cornell University Ithaca, NY, 14853, May 21, 2020 (May 21, 2020), 10 pages, XP081676183.

Wang et al., "DMFP: A Dynamic Multi-faceted Fine-Grained Preference Model for Recommendation", 2019 IEEE International Conference on Data Mining (ICDM), IEEE, Nov. 8, 2019 (Nov. 8, 2019), pp. 608-617, XP033700368.

\* cited by examiner

| Datasets | # Users | # Items | Avg. length | # Attributes |
|---|---|---|---|---|
| EPR | 229314 | 23 | 17.04 | 169 |
| SPR | 956645 | 24 | 14.51 | 24 |
| Ta-Feng | 13541 | 7691 | 7.12 | 5 |

FIG. 7

| Dataset | Metric | FMC | FPMC | SASRec | Bert4Rec | DREAM | Beacon | FDSA+ | Daicon | Improv. |
|---|---|---|---|---|---|---|---|---|---|---|
| EPR | HR@5 | 0.1441 | 0.1066 | 0.4707 | 0.5749 | 0.4817 | 0.5978 | 0.6191 | 0.6828 | +10.28% |
|  | HR@10 | 0.2155 | 0.2578 | 0.6728 | 0.7515 | 0.6806 | 0.7230 | 0.7323 | 0.7816 | +6.73% |
|  | NDCG@5 | 0.0780 | 0.0930 | 0.1994 | 0.2738 | 0.2515 | 0.2576 | 0.4511 | 0.5401 | +19.73% |
|  | NDCG@10 | 0.1004 | 0.1361 | 0.2612 | 0.3279 | 0.3117 | 0.3016 | 0.5231 | 0.5719 | +9.32% |
|  | MAP | 0.1026 | 0.1239 | 0.1581 | 0.2114 | 0.2184 | 0.2042 | 0.3520 | 0.3799 | +7.92% |
| SPR | MAP@7 | 0.0055 | 0.0063 | 0.0118 | 0.0127 | 0.0102 | 0.0124 | 0.0239 | 0.0271 | +13.38% |
| Ta-Feng | HR@5 | 0.0064 | 0.0089 | 0.0308 | 0.0265 | 0.0401 | 0.0442 | 0.0301 | 0.0573 | +29.63% |
|  | HR@10 | 0.0089 | 0.0095 | 0.0441 | 0.0410 | 0.0451 | 0.0590 | 0.0381 | 0.0624 | +5.7% |
|  | NDCG@5 | 0.0035 | 0.0044 | 0.0155 | 0.0129 | 0.0226 | 0.0256 | 0.0141 | 0.0308 | +20.31% |
|  | NDCG@10 | 0.0043 | 0.0046 | 0.0195 | 0.0174 | 0.0241 | 0.0301 | 0.0181 | 0.0324 | +7.64% |
|  | MAP | 0.0027 | 0.0039 | 0.0160 | 0.0142 | 0.0200 | 0.0255 | 0.0188 | 0.0265 | +3.92% |

FIG. 8

|         | Daicon(B-) | Daicon(B) | Daicon(T) | Daicon(I) | Daicon |
|---------|------------|-----------|-----------|-----------|--------|
| HR@1    | 0.3202     | 0.3416    | 0.3650    | 0.3659    | 0.3695 |
| HR@5    | 0.6323     | 0.6740    | 0.6721    | 0.6802    | 0.6828 |
| HR@10   | 0.7567     | 0.7544    | 0.7710    | 0.7602    | 0.7816 |
| NDCG@5  | 0.5157     | 0.5215    | 0.5341    | 0.5024    | 0.5401 |
| NDCG@10 | 0.5468     | 0.5604    | 0.5659    | 0.5505    | 0.5719 |
| MAP     | 0.3649     | 0.3695    | 0.3775    | 0.3670    | 0.3799 |
FIG. 9
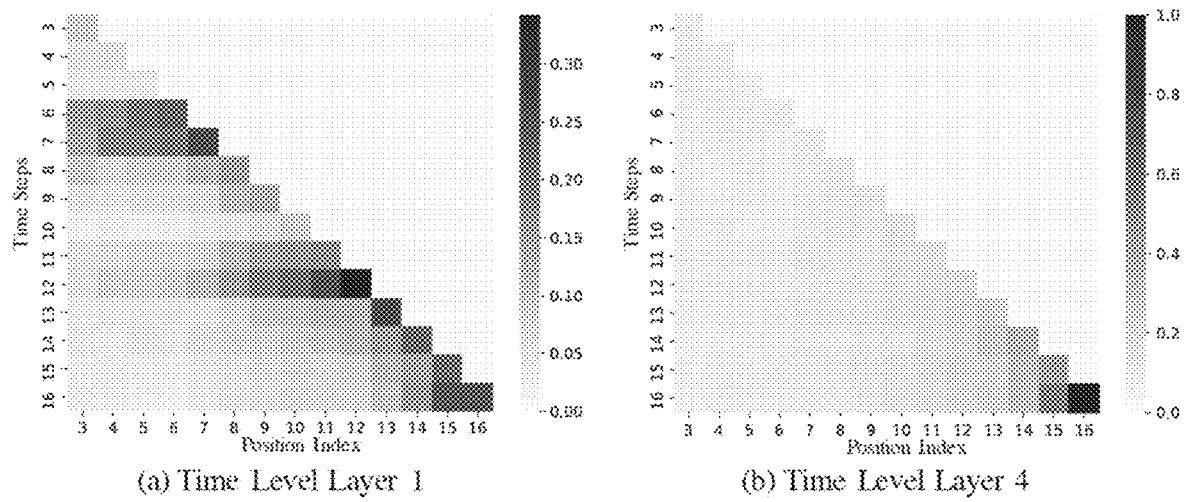
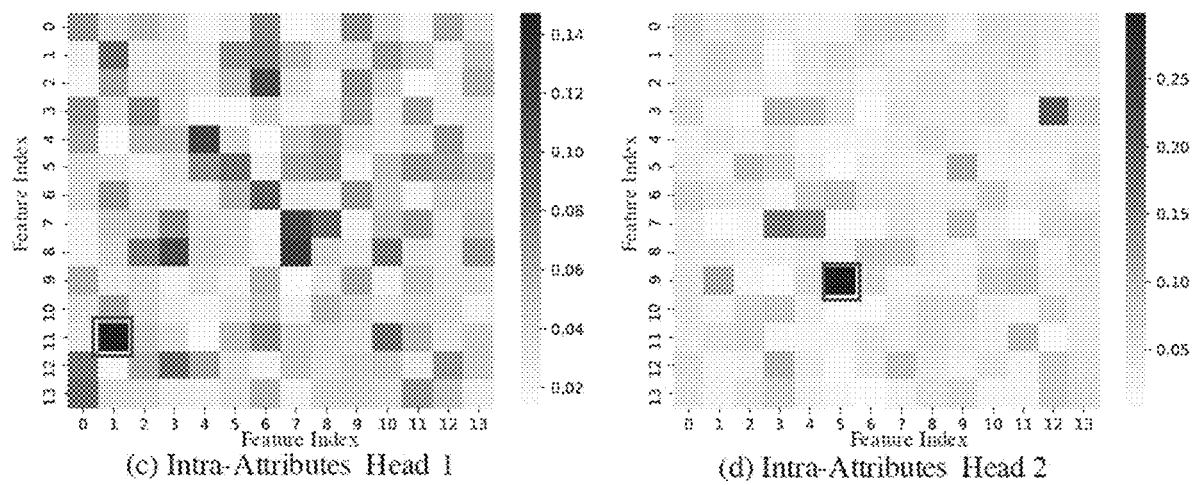
FIG. 10

SYSTEMS AND METHODS FOR NEXT BASKET RECOMMENDATION WITH DYNAMIC ATTRIBUTES MODELING

CROSS-REFERENCE(S)

The present disclosure is a nonprovisional application of and claims priority under 35 U.S.C. 119 to Indian provisional application no. 202041035500, filed Aug. 18, 2020, which is hereby expressly incorporated by reference herein in its entirety.

TECHNICAL FIELD

The present disclosure relates generally to machine learning models and neural networks, and more specifically, to next basket recommendation with dynamic attributes modeling of high-order features and item interactions.

BACKGROUND

Sequential recommendation is widely applied to various applications such as product recommendation in an e-commerce website, video recommendation, and music recommendation. In the sequential recommendation setting, a user has a sequence of historical interactions (e.g. clicks, purchases) with different items. The recommendation mechanism predicts consecutive items according to the historical behavior of a user. For example, by modeling the sequential patterns from the historical interactions, the sequential recommendation mechanism recommends items that a user will likely interact with at the next timestep. Existing sequential recommendation systems only consider the user historical interacted items while ignoring the attributes of items or users. Thus, the recommendation made by existing systems that ignore the attributes of items or users themselves can sometimes be rather inaccurate or even irrelevant, leading to unsatisfactory user experience.

BRIEF DESCRIPTION OF THE DRAWINGS

FIG. 7 provides a table summary statistics of example training datasets for the recommendation module 130, according to one embodiment described herein.

FIG. 8 provides a table showing the overall results comparing with seven baseline approaches, according to one embodiment described herein.

FIG. 9 provides a table showing ablation study of the recommendation module, according to one embodiment described herein.

FIG. 10 provides a visualization view of average time-level and intra-attribute attention weights on an example training dataset, according to one embodiment described herein.

Figure 1:
FIG. 1 shows a block diagram illustrating an example recommendation system modeling dynamic attributes with item and feature interactions, according to embodiments described herein.

In the figures and appendix, elements having the same designations have the same or similar functions.

DETAILED DESCRIPTION

Existing sequential recommendation systems mostly only consider the user historical interacted items while ignoring the attributes of items or users. In particular, as user interests and/or the item attributes may change over time, recommendations ignoring the dynamic attributes of the items or the users can be largely inaccurate over time.

Some existing systems may incorporate static item attributes, for example, category and brand of a product, to improve the recommendation performance. However, for many applications, there are also dynamic user and item attributes that change over time. Such attributes provide important descriptions of either the shift of user interests or the change in item properties. For example, in an application recommendation setting, there are dynamic attributes such as the amount of time a user spends on different apps, which may vary day by day and provide information on the user preferences and needs of different apps. For another example, in a workout recommendation setting, the altitude, speed, and heart rate of the user are relevant information that may change over time. Moreover, there are often seasonal patterns in sequential recommendations. For instance, a user who bought a gift card last New Year is more likely to buy gift cards for the next New Year. For another example, swimming suits can be popular during summer time.

In some embodiments, sequential recommendation may be made in the form of next basket recommendation, in which a user can interact with more than one items at each time step. For example, people purchase multiple products in the same shopping cart or order different dishes when ordering one meal online. Some existing systems may mine the sequence pattern among a series of basket items. However, the relationship among items in the same basket can also provide helpful information. Thus, modeling the sequential patterns (e.g. buy a phone then buy a phone case) and the relationship among items in the same basket (e.g. bread and butter are commonly brought together) are both important for understanding the relationships between items. For instance, some items (e.g. bread and butter) are commonly brought together. To capture the relationship between items in the same basket, some existing systems use a correlation matrix based on the frequency of item co-occurring in baskets and then incorporate it into modeling, which, however, it treats the correlation among items as static information instead of dynamically learnt.

In addition to the item interactions, higher-order interactions between different features are another important aspect for improving recommendation performance. For instance, the movie "Frozen' may be recommended to a 10 years old girl. The third-order features (gender: female, age: 10, genre: animation) provided useful information about this recommendation. Learning such high-order feature interactions automatically instead of relying on domain experts to hand engineer them still remains challenging.

Therefore, in view of the need to provide sequential recommendation that captures users' temporal transaction patterns and intra basket correlations from user historical interacted items, as well as implicit dynamic appetites and high-order feature interactions from dynamic user/item attributes, embodiments described herein provide an attentive network framework that models dynamic attributes with item and feature interactions. Specifically, the attentive network framework first encodes basket item sequences and dynamic attribute sequences with time-aware padding and time/month encoding to capture the seasonal patterns (e.g. in app recommendation, outdoor activities apps are more suitable for summer time while indoor activity apps are better for winter). Then the attentive network framework applies time-level attention modules on basket items' sequences and dynamic user attributes' sequences to capture basket items to basket items and attributes to attributes temporal sequential patterns. After that, an intra-basket attentive module is used on items in each basket to capture the correlation information among items. Using self-attention, the interaction among items is adaptively learnt during model training. The self-attention modules can also be leveraged on attributes of each time step to generate high-order feature interactions.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIG. 1 shows a block diagram illustrating an example recommendation system modeling dynamic attributes with item and feature interactions, according to embodiments described herein. Diagram 100 shows a recommendation system 130 that receives dynamic attributes 113$a$-$n$ relating to a user 110, dynamic attributes 114$a$-$n$ relating to basket item(s) 112, time aware factors 116, and/or the like.

For example, the user dynamic attribute 113$a$-$n$ may include attributes that indicate time-varying or dynamic attributes of the user, such as age, location, application usage on a user device, seasonal interests, and/or the like. The time aware factors 116 may include the time of year, trends (e.g., movies in theatre at a certain time, etc.), and/or the like. The dynamic attributes 114$a$-$n$ of the past basket may include attributes of the basket items, dynamic combination of the basket items (e.g., item A may often be combined with item B at a certain time of the year or may often be combined with item C at a different time, etc.), and/or the like.

The recommendation system 130 may learn from the historical interactions between users and items, and also the dynamic attributes 113$a$-$n$ of the user, and the dynamic attributes of items 114$a$-$n$ to make a recommendation of the next item 125. Specifically, the recommendation system 130 may obtain information relating to a set of users U with a total number of users $|U|$, and a set of items V with a total number of items $|V|$. The users or items have a set of attributes denoted by F, with a total number of attributes $|F|$. For any user $u \in U$, e.g., user 110, a sequence of baskets $B^u = \{B_1^u, B_2^u, \ldots, B_{T_u}^u\}$ represents the item interactions sorted by time during the time period $[0, T_u]$. The time period $T_u$ may be different per user, and T may be the maximum time steps in each sequence, where $t \in \{1, 2, 3, \ldots, T\}$ as one-time step of the sequence of baskets. $B_t^u \subseteq V$ is a set of items that user u interacted at time step t. A sequence $A^u = \{A_1^u, A_2^u, \ldots, A_{T_u}^u\}$ represents the value of dynamic user attributes of user u ordered by time. $A_t^u = \{a_{t,1}^u, a_{t,2}^u, \ldots, a_{t,|F|}^u\}$ are all the attribute values of u at time step t. Specifically, $A_{t,cat}^u$ represents the categorical attribute values of user u at time t, and $A_{t,num}^u$ represents the numerical attribute values of user u at time t. Thus, the recommendation system 130 may predict basket items that user u (e.g., user 110) will interact with at $t=T+1$ time step given maximally T time historical $B^u$ and $A^u$ information.

Figure 2A:
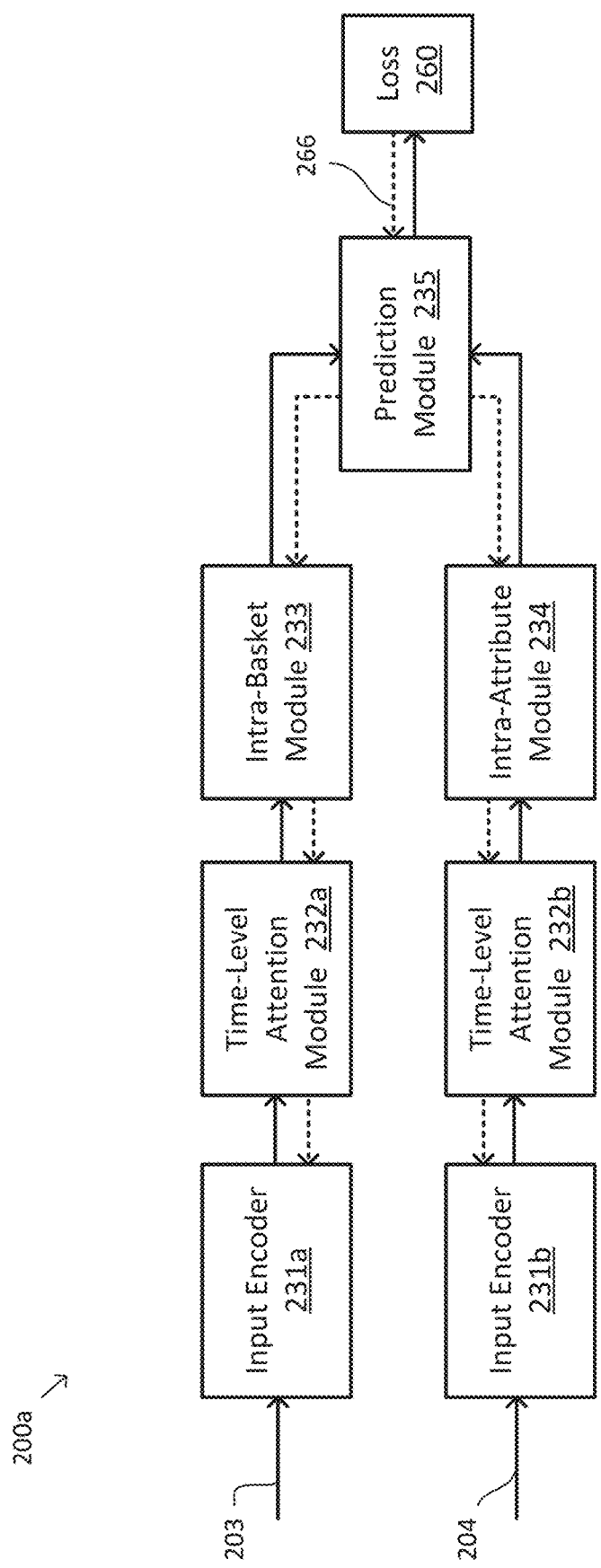
FIG. 2A is a block diagram illustrating an example architecture of the recommendation module in FIG. 1.
Figure 2B:
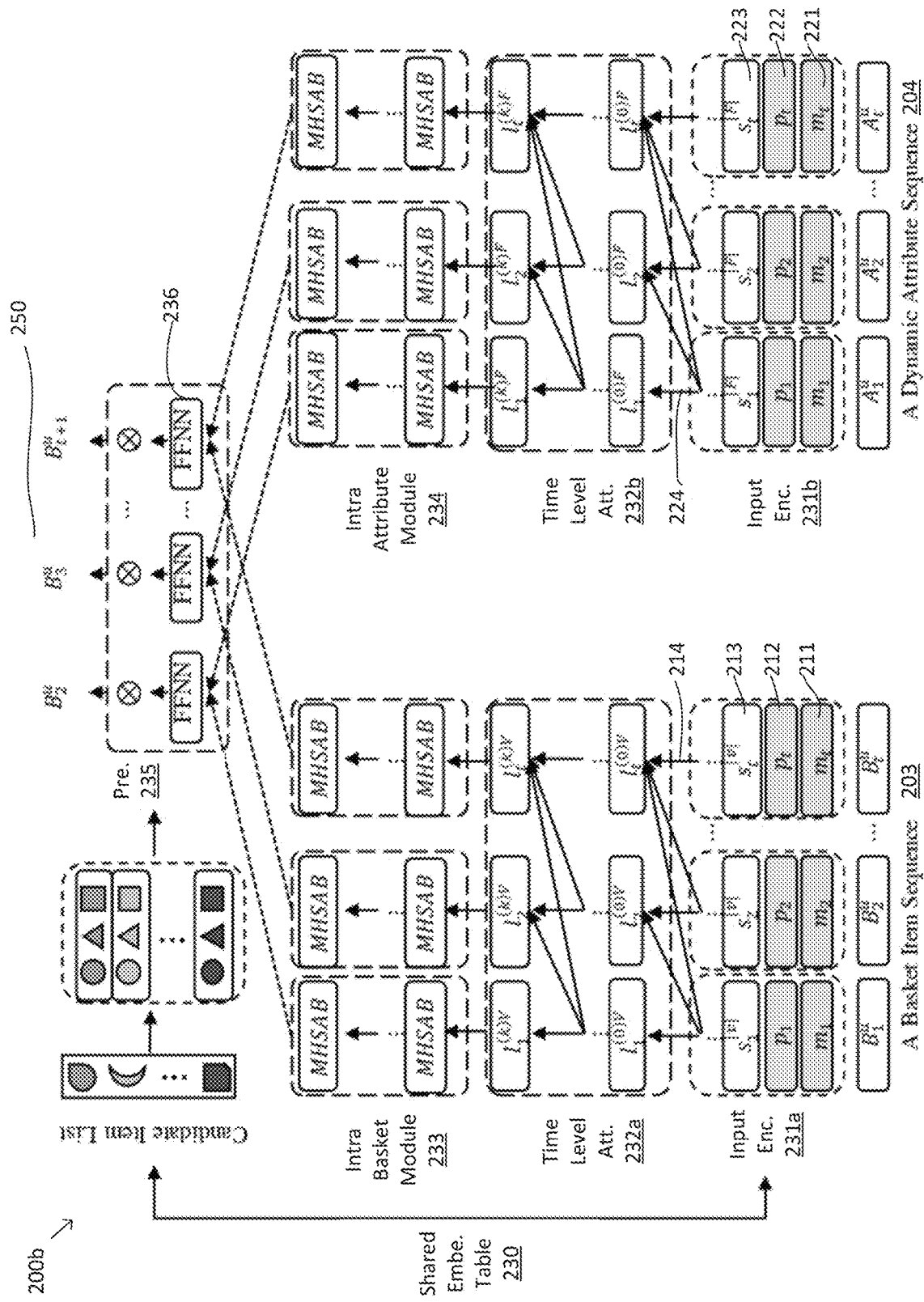
FIG. 2B is a block diagram providing detailed structures of modules shown in FIG. 2A, according to one embodiment.

FIG. 2A is a block diagram 200$a$ illustrating an example architecture of the recommendation module 130 in FIG. 1, and FIG. 2B is a block diagram 200$b$ providing detailed structures of modules shown in FIG. 2A, according to one embodiment. Diagram 200$a$ shows an attentive network framework that models dynamic attributes with item and feature interactions. The framework may include an Input Encoder (231$a$ and 231$b$, or collectively referred to as 231), a Time-Level Attention Module (232$a$ and 232$b$, or collectively referred to as 232, an Intro-Basket Module 233 and Intra-Attribute Module 234, and a Prediction Module 235.

The input encoder 231 receives and encodes sparse representation of a basket item sequence 203 and/or a categorical dynamic attribute sequence 204 into dense representations and normalizes numerical dynamic attributes. Specifically, at each time step, the best item sequence $B_t^u$ and dynamic user attributes $A_t^u$ are received at the input encoder 231$a$ and 231$b$. In some implementations, the input encoders 231$a$ and 231$b$ may be two input encoders operated in parallel. In another implementation, the input encoders 231$a$ and 231$b$ may be the same input encoder that is configured to encode the basket item sequence 203 and the dynamic attribute sequence 204, concurrently, alternately or sequentially in any order at each time step.

The input encoder 231$a$ may obtain, for each basket item sequence $B_t^u$ in the basket item sequence 203, a $|V|$-dimensional multi-hot representation to represent the information of item set, denoted by $e_t^V \in \mathbb{R}^{|V| \times 1}$. Specifically, the vector index corresponds to item ID and it is set to 1 if the item exists in basket $B_t^u$, or 0 if the item does not exists in the basket. The input encoder 231$a$ may then use a concatenation-based lookup function to encode $e_t^V$ into latent representations 213, e.g., $$s_t^V = \text{CONCAT-LOOKUP}(Q, e_t^V),$$

where the CONCAT-LOOKUP function first looks up the embedding vectors of items in $B_t^u$, and then concatenates all vectors together to form the latent representation $s_t^V \in \mathbb{R}^{|V| \times D}$, $|V_t|$ is the total number of items in $B_t^u$. The embedding dimension of each item and each categorical attribute is D. $Q \in \mathbb{R}^{(|V|+1) \times D}$ is learnable embedding matrix for lookup. After applying the "CONCAT-LOOKUP" function, the input encoder 231$a$ generates, for each item i in basket $B_t^u$, a corresponding embedding vector $s_t^i \in \mathbb{R}^{1 \times D}$. Since the number of items in each basket varies, the maximum number of items in the basket is set as $|V_{max}|$ and the ones with size less than $|V_{max}|$ are padded using vector $q \in \mathbb{R}^{1 \times D}$ (q is the first embedding vector of Q).

Similarly, for dynamic user attributes in the dynamic attribute sequence 204, categorical and numerical attributes are modeled differently. The categorical attributes $A_{t,cat}^u \subseteq A_t^u$ are represented by a $|F_{cat}|$-dimensional multi-hot vector denoted by $e_t^{Fcat} \in \mathbb{R}^{|F_{cat}| \times 1}$. The values of numerical attributes are normalized into a range from −1 to 1 using the min-max normalization, denoted as $s_t^{Fnum} \in \mathbb{R}^{|F_{num}| \times 1}$. Then the input encoder 231b encodes categorical attributes vector representation $e_t^{Fcat}$ into latent representation below:

$$s_t^{Fcat} = \text{CONCAT-LOOKUP}(R, e_t^{Fcat})$$

where $R \in \mathbb{R}^{|Fcat| \times D}$ is learnable embedding matrix for lookup; and $s_t^{Fcat} \in \mathbb{R}^{|Fcat| \times D}$ is the latent dense representation of $A_{t,cat}$.

In one embodiment, as the length of sequences of baskets and sequences of users' attributes varies for different users, the maximum sequence length is set as T to get up to the latest T time steps' information. If the sequence length is greater than T, the sequence is truncated to the latest T time steps information. If the sequence length is shorter than T, a zero-pad operation may be applied to the empty positions. Instead of padding zeros to the beginning of the sequence until the sequence length is T, input encoder 231 pads zeros to the missed time steps. For example, for two sequences from months {1th, 2nd, 3rd} and {1th, 3rd, 5th} and the maximum sequence length is 5. Padding on the beginning will ignore the time shift information. Instead, zeros are padded to the end of sequence (rep resents 4th and 5th months) for the first sequence and fill in zeros before the 3rd and 5th months (represents 2nd and 4th months) for the second sequence. With this padding operation, the model can identify the difference between these two sequences. After padding, $S^V \in \mathbb{R}^{T \times |V| \times D}$, $S^{Fcat} \in \mathbb{R}^{T \times |Fcat| \times D}$, and $S^{Fnum} \in \mathbb{R}^{T \times |Fnum| \times 1}$ represent the sequences of basket items, categorical attributes, and numerical attributes correspondingly.

Although padding technique may result in longer sequences as input data when compared with approaches without padding. But in practice, the duration of each time step (basket) depends on the applications. For example, when the training data contains about 4 months data, each day is treated for a basket for efficient training. Training per each hour or minute as a basket may only generate sparse information for each basket.

In one embodiment, the input encoder 231 utilizes the sequential information of the input 203 and 204 by adding positional embedding $P = \{p_1, p_2, \ldots, p_T\} \in \mathbb{R}^{T \times D}$ into the input sequences, where $p_t$ is the D-dimensional positional embedding vector 213 at time t. Additionally, a month index embedding $M = \{m_1, m_2, \ldots, m_{12}\} \in \mathbb{R}^{12 \times D}$ is added for the time-level attention modules 232a-b to discover seasonal patterns, where $m_t$ is the D-dimensional month index embedding vector 211 at time t. The difference between positional embedding and month embedding is that the month index may repeat over every 12 time steps of a sequence. Thus, the positional and month code embedding are concatenated with the latent representation 213 $s_t^V$ as below:

$$l_t^V = [s_t^V, p_t, m_t], t \in \{1, 2, 3, \ldots, T\}$$

where the representation of a basket sequence is formed as $L^V = \{l_1^V, l_2^V, \ldots, l_T^V\} \in \mathbb{R}^{T \times (|Vmax|+2) \times D}$. The encoded representation 214 of the basket sequence $L^V$ is then sent from the input encoder 231a to the time level attention module 232a.

Similarly, at input encoder 231b, positional index embeddings 222 and month index embeddings 222 are added to the latent representations 223 of $s_t^{Fcat}$ and $s_t^{Fnum}$ to obtain the encoded representations 224 $L^{Fcat}$ and $L^{Fnum}$ respectively. The encoded representation 224 of the dynamic attribute sequence 204 is then sent from the input encoder 231b to the time level attention module 232b.

The time-level attention modules 232a-b are applied to the encoded basket sequences and user attribute sequences separately to capture both users' sequential transaction patterns and implicit dynamic appetites. The time-level attention modules 232a-b may receive the dense tensor representations of input sequences $L^V$, $L^{Fcat}$ and $L^{Fnum}$. Instead of taking a weighted sum across all item representations in a basket and all attribute values at each time, the tensor representations are shaped into 2D matrices, where $L^V \in \mathbb{R}^{T \times ((|Vmax|+2)D)}$, $L^{Fcat} \in \mathbb{R}^{T \times ((|Fcat|+2)D)}$ and $L^{Fnum} \in \mathbb{R}^{F \times (|Fnum|+2)}$.

Figure 3:
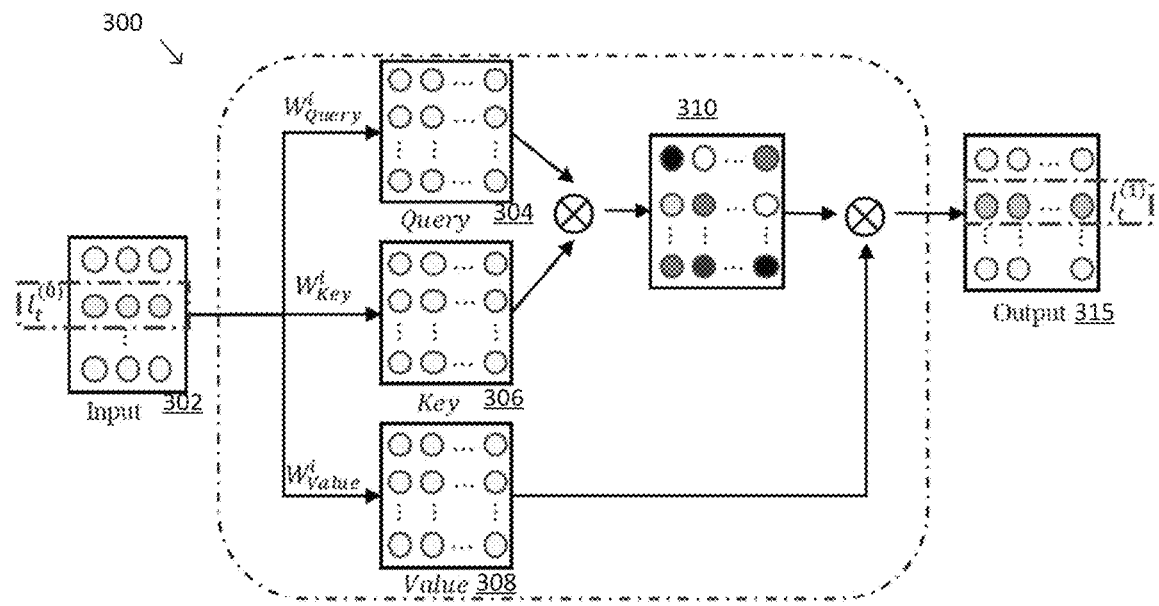
FIG. 3 provides a simplified block diagram illustrating an example operation of the multi-head self-attention block (MHSAB), according to embodiments described herein.

The time-level attention modules 232a-b may each comprise a plurality of multi-head self-attention modules (MHSABs), which are applied to the 2D matrices $L^V$, $L^{Fcat}$ and $L^{Fnum}$ to capture time level sequential patterns separately. For example, FIG. 3 provides a simplified block diagram illustrating an example operation of the MHSAB, according to embodiments described herein. Specifically, an attention block can be described as mapping a (Query) 304 and a set of (Key)-(Value) pairs of 306 and 308 to an output 315. In a MHSA block, the Query 304, Key 306, and Value 308 are the same and be projected into multiple sub-spaces with different learned projection matrices. Here, Query 304, Key 306 and Value 308 are first projected from an input 302 of $L^{(0)}$ (let $L^{(0)} = L$, any of the tensor representations from the input encoder 231). The projected Query 304 and projected Key 306 are then multiplied to result in representation 310, which is then applied to the projected value 308 to obtain the self-attention output 315.

Figure 4:
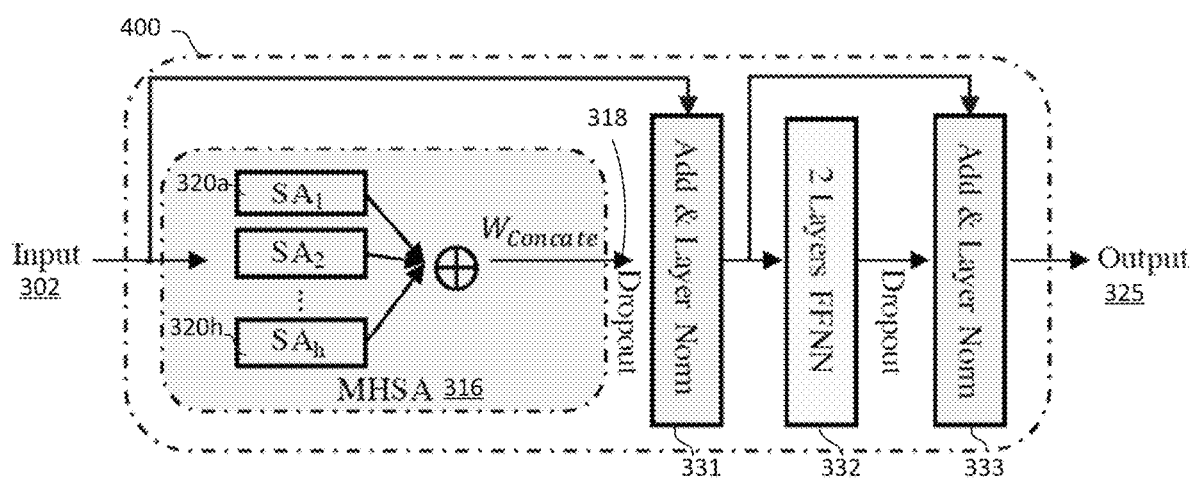
FIG. 4 provides a simplified block diagram illustrating an example architecture of a MHSAB, according to embodiments described herein.

FIG. 4 provides a simplified block diagram illustrating an example architecture of a MHSAB 400, according to embodiments described herein. The MHASB 400 includes an MHSA 316 (which is operated similarly as the diagram 300 in FIG. 3), a normalization layer 331, two layers of feed forward neural networks (FFNNs) 332, and another normalization layer 333. The MHSA 316 receives the input 302 into a plurality of parallel self-attention (SA) blocks 320a-h, and the output from each SA block are concatenated to form the output 318:

$$M^{(1)} = \text{MHSA}(L^{(0)}, h) = [\text{head}_1, \text{head}_2, \ldots, \text{head}_h] W_{concate},$$

$$\text{head}_i = SA_i(L^{(0)} W_{Query}^i, L^{(0)} W_{Key}^i, L^{(0)} W_{Value}^i).$$

where SA is the self-attention mapping, h is the number of sub-spaces, $W_{Query}^i \in \mathbb{R}^{C \times C'}$, $W_{Key}^i \in \mathbb{R}^{C \times C'}$, $W_{Value}^i \in \mathbb{R}^{C \times C'}$ and $W_{Concate}^i \in \mathbb{R}^{C' \times C}$ are learned parameters ($C = |F_{cat}| + 2/D$), and $C' = hC$.

In one embodiment, as the sequences are in the chronological order, the model may only consider up to t time steps information when making prediction for t+1 time step. To avoid the attention module peeking into future steps information, a causality mask may be added to the MHSA block to forbid all links between $Query_i$ and $Key_j$ when $j > i$.

In one embodiment, to enhance the performance of representation learning of self-attention block, residual connection, dropout, a layer normalization and two-layer fully connected layers with ReLU activation functions may be applied to the MHSA output 318:

$$M^{(1)} = \text{LayerNorm}(\text{Dropout}(M^{(1)}) + L^{(0)}),$$

$$L^{(1)} = \text{ReLU}((M^{(1)} W_1 + b_1) W_2 + b_2),$$

$$L^{(1)} = \text{LayerNorm}(\text{Dropout}(L^{(1)}) + M^{(1)}).$$

Thus, the output 325 from the entire MHSAB may be obtained as:

$$L^{(1)} = \text{MHSAB}(L^{(0)}, h).$$

Multiple (k>1) MHSABs shown in FIG. 4 may be stacked to capture more complex feature interactions:

$$L^{(k)} = \text{MHSAB}(L^{(k-1)}, h^k), k > 0$$

where $L^{(0)} = L$ and $h^k$ is the number of heads at the $k^{th}$ attention block.

Referring to FIG. 2, the intra-basket module 233 and the intra-attribute attention module 234 are used to extract item interaction information and feature interaction information correspondingly. Each of the intra-basket module 233 and the intra-attribute attention module 234 may comprise one or more stacks of MHSABs, and each stack of MHSAB includes one or more sequentially connected MHSABs. The MHSAB may be similar to block 400 shown in FIG. 4.

Specifically, the interaction information among a basket of items has been proven useful for improving next basket recommendation results. In addition, high-order feature interactions have also shown to improve the prediction results. Thus, MHSABs are applied on the basket and dynamic attributes at each time step t. This allows the model to mine the interactions among basket items and generate high-order feature interactions which can help the model make better recommendations.

For example, for the categorical attribute sequence, the intra-basket module 233 or the intra-attribute module 234 receives the output representation matrix $L^{(k)} \in \mathbb{R}^{T \times ((|Fcat|+2)D)}$ (short name for $L^{(k)Fcat}$) from the time level attention module 232b. The output representation is shaped into a 3D tensor $L^{(k)} \in \mathbb{R}^{T \times (|Fcat|+2) \times D}$, and then the MHSAB is applied to the 3D tensor $L^{(k)}$ at each time step of categorical user attributes representation $L^{(k)}$. Thus, the user attributes representation is update by the stack of MHSABs as:

$$L_t(k+1) = \text{MHSAB}(L_t^{(k)}, h^{(k+1)}), k > 0, t \in \{1, 2, \ldots, T\}$$

where $L_t^{(k)}$ is the output of time level attention module at time t, and $h^{k+1}$ is the $(k+1)^{th}$ attention block.

Thus, at time t, interactions among the categorical attributes $L_t^{(k+1)Fcat}$ may be obtained as described above. The MHSABs may be stacked multiple times to capture higher level categorical attribute interactions, e.g., $L_t^{(k+m)Fcat}$, m>1. Similarly, the interactions among the basket items $L_t^{(k+1)V}$ and the interactions among the numerical attributes $L_t^{(k+1)Fnum}$ may be obtained similarly at each time step t.

The prediction module 235 receives and couples the outputs $L_t^{(k+m)V}$, $L_t^{(k+m)Fcat}$, $L_t^{(k+m)Fnum}$ from the intra-basket and the intra-attribute attention modules 233 and 234 to generate the final prediction 250. Specifically, to capture patterns of basket items and dynamic attributes, and to incorporate the item and attribute interaction information simultaneously at time t, the prediction module 235 includes fully connected layers of a feedforward neural network 236 that apply to the concatenated inputs:

$$L_t^{all} = \text{FFNN}([L_t^{(k+m)V}, L_t^{(k+m)Fcat}, L_t^{(k+m)Fnum}]).$$

where $L_t^{all} \in \mathbb{R}^{1 \times D}$ is the high-level features containing temporal pattern information of basket items and dynamic attributes over past t times, as well as item and attribute interaction information.

The prediction module 235 further receives the shared embedding table 230, e.g., the item embedding matrix Q, from the input encoder 231a, which provide a candidate item list. It is then used to predict t+1 time step basket items. Specifically, the relevance of item i is predicted as follows:

$$r_{i,t} = L_t^{all} \cdot Q_i^t, t \in \{1, 2, \ldots, T\}$$

where $r_{i,t}$ is the recommendation score for item i to be recommended next given first t basket items and dynamic user attributes. Q is the item embedding matrix which is shared for encoding basket items in input encoders. The recommendation scores $r_{i,t}$ for all i's, can then be used to generate the next recommended item 250 $B_{T+1}^u$ for the next time step t+1, e.g., using a softmax operation. 2

Referring to FIG. 2A, during training stage, the output $r_{i,t}$ from the prediction module 235 is then sent to the loss module 260 to compute a binary cross-entropy loss:

$$L = -\sum_{B^u \in B} \sum_{t \in \{1,\ldots,T\}} \left[ \sum_{i \in B_{t+1}^u} \log(\sigma(r_{i,t})) + \sum_{j \notin B_{t+1}^u} \log(1 - \sigma(r_{j,t})) \right]$$

where σ is the sigmoid function $$\sigma(x) = \frac{1}{1 + e^{-x}}.$$

At each time step t in each sequence, the relevant score $r_{i,t}$ for each item i in V. The target basket items for user u are a shifted version of $B^u$, denoted by $\{B_2^u, B_3^u, \ldots, B_{T+1}^u\}$. The loss L may then be used to update modules 235, 234, 233, 232a-b and 231a-b, e.g., through the backpropagation path 266 (shown in dashed line).

Figure 5:
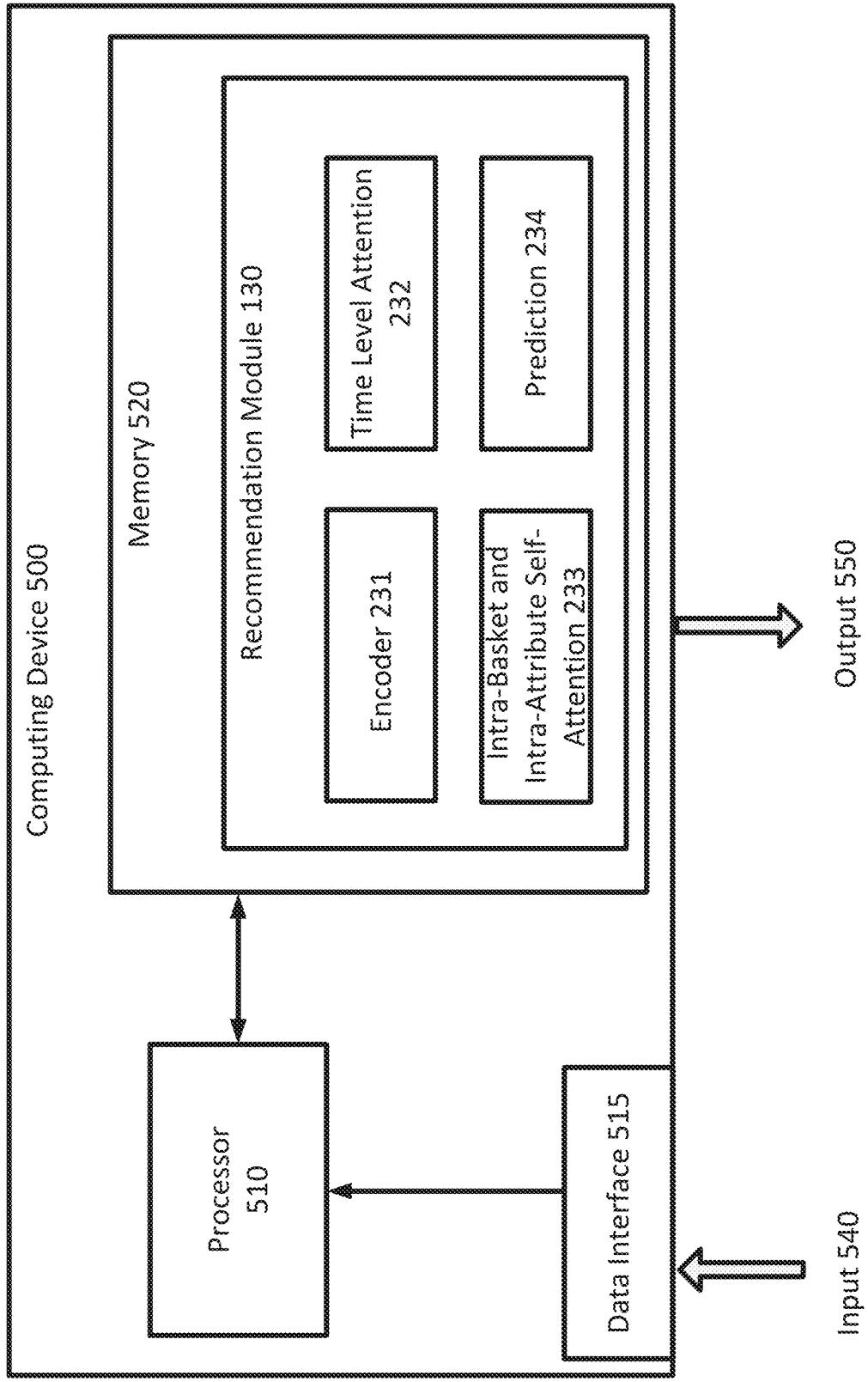
FIG. 5 is a simplified diagram of a computing device for implementing the recommendation system modeling dynamic attributes with item and feature interactions described throughout the disclosure, according to some embodiments.

FIG. 5 is a simplified diagram of a computing device 500 for implementing the recommendation system modeling dynamic attributes with item and feature interactions described throughout the disclosure, according to some embodiments. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for a recommendation module 130 that may be used to implement and/or emulate the systems and models, and/or to implement any of the methods described further herein. In some examples, the recommendation module 130, may receive an input 540, e.g., a sequence of baskets representing the user's item interaction records sorted by time. The data interface 515 may be any of a user interface that receives a user entered input, or a communication interface that may receive or retrieve a data sequence from a database. The recommendation module 130 may generate an output 550, e.g., a next recommended item given the first sequence of basket items and dynamic user attributes.

In some embodiments, the recommendation module 130 includes an encoder 231, a time level attention module 232, one or more intra-basket and intra-attribute self-attention modules 233 and a prediction module 234. The modules 231-234 are further illustrated in FIGS. 2A-2B.

The architecture of the recommendation module 130 for implementing submodules 231-234 can be similar to diagrams 200*a-b* in FIGS. 2A-2B. In some examples, the recommendation module 130 and the sub-modules 231-234 may be implemented using hardware, software, and/or a combination of hardware and software.

Figure 6:
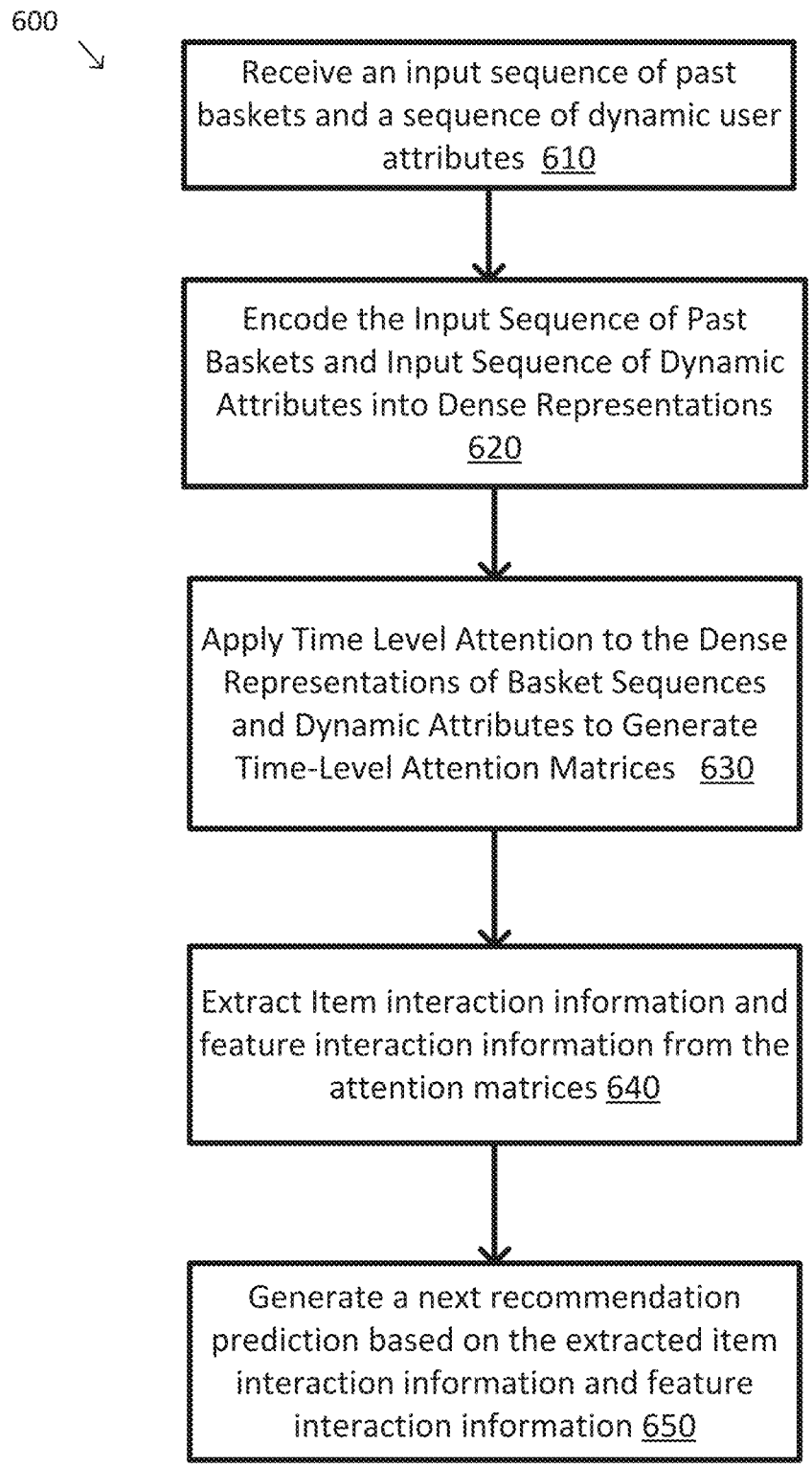
FIG. 6 is a simplified logic flow diagram illustrating a method for next basket recommendation using dynamic attributes of items, according to some embodiments described herein.

FIG. 6 is a simplified logic flow diagram illustrating a method for next basket recommendation using dynamic attributes of items, according to some embodiments described herein. One or more of the processes 610-650 of method 600 may be implemented, at least in part, in the form of executable code stored on non-transitory, tangible, machine-readable media that when run by one or more processors may cause the one or more processors to perform one or more of the processes 610-650. In some embodiments, method 600 may correspond to the method used by the recommendation module 130.

At process 610, an input sequence of past baskets (e.g., 203 in FIGS. 2A-2B) and a sequence of dynamic user attributes (e.g., 204 in FIGS. 2A-2B) are received. For example, the input sequence of past baskets represents the user's item interaction records sorted by time.

At process 620, the input sequence of past baskets and the input sequence of dynamic attributes are encoded into dense representations, e.g., $L^V$, $L^{Fcat}$, $L^{Fnum}$. For example, the encoding may be performed via embedding lookup and time-aware padding operations, and positional or month index embedding, as described in relation to input encoders 231*a-b* in FIG. 2B.

At process 630, time-level attention are applied to the dense representations to capture both users' sequential transaction patterns and implicit dynamic appetites, e.g., to generate time-level attention matrices $L^{(k)}V$, $L^{(k)Fcat}$, $L^{(k)Fnum}$, k>0. Further details of time-level attention can be found in relation to time-level attention modules 232*a-b* in FIGS. 2A-2B.

At process 640, item interaction information and feature interaction information are extracted from the attended dense representations. For example, a stack of MHSABs may be applied on the time-level attention matrices corresponding to basket and dynamic attributes respectively, at each time step in parallel, such that the correlation among basket items and generating high-order feature crosses are extracted to result in better recommendations. The resulting basket attention matrix, and the attribute attention matrix are $L^{(k+m)V}$, $L_{(k+m)Fcat}$, $L^{(k+m)Fnum}$. Further details relating to the self-attention are provided in relation to intra-basket and intra-attribute self-attention modules 233 and 234 in FIGS. 2A-2B.

At process 650, the next recommendation prediction is generated based on the basket item attention matrix and the attribute attention matrix, indicating extracted item interaction information and feature interaction information. Further details relating to generating the next recommendation prediction is described in relation to the prediction module 235 in FIGS. 2A-2B.

Example Performance

FIG. 7 provides a table summary statistics of example training datasets for the recommendation module 130, according to one embodiment described herein. The datasets shown in FIG. 7 represent a diverse set of domains with different number of user, items, and attributes. Enterprise Product Recommendation (EPR) dataset is a private dataset sampled from a leading enterprise cloud platform. The task is to recommend products to businesses. It contains 24 months (from January 2017 to December 2018) of enterprise customers' product purchase records as well as 161 dynamic user attributes. Examples of the dynamic attributes are the business' product usage metrics, behavior metrics on the website, sales information, and marketing activities of the business.

Santander Product Recommendation (SPR)1 dataset is a public dataset on product recommendation for the Santander bank. It contains 18 months of user purchase information as well as user attributes. Dynamic attributes are also included. For example, the "indrel_1mes" represents the customer type such as primary customer, potential, etc. It can be changed from one type to another each month. The "antiguedad" represents the customer seniority in months.

Ta-Feng dataset is a grocery shopping dataset containing transactions from November 2000 to February 2001. Each transaction is a basket purchased items. Additionally, 5 attributes are also provided (AGE_GROUP, etc.). Although it does not contain dynamic attributes, the recommendation approach described herein is still effective because of modeling the temporal patterns of user interacted basket item sequences, high-order item interactions, and high-order attribute interactions.

Specifically, for each user u, the top K items in the ranking list of all items for the next basket recommendation are selected. The timestep up to time step t is used when making predictions for time step t+1. For EPR dataset, first 20 months data is used as training set and the 21th month data as validation data to tune the model. For testing, the best parameters are used to train on the first 21 months data. The successive three months data (22th-24th) is treated as test set. For SPR dataset, in terms of the attributes with missing values, the most frequent one for categorical attributes and the mean value for numerical attributes are filled in. The first 17 months of data is used as training data. The data is first split into training and validation with 80% and 20% for model tuning and then train on all the training data. The evaluation is performed on the 18th month data. For Ta-Feng dataset, the users with less than 10 purchases and the items which are purchased less than 10 times are removed. The first 3 months data is used as training set, following 0.5 month data as validation set to tune the model. The model is trained on the first 3.5 months data. Note that although Ta-Feng dataset contains four months data, the temporal patterns can include weekday/weekend patterns instead of seasonal patterns.

Evaluation metrics such as Hit Rate (HR@K), Normalized Discounted Cumulative Gain (NDCG@K), and Mean Average Precision (MAP@K) are used for EPR and Ta-Feng datasets. The choices of K in terms of MAP are 23 and 7691 in EPR and Ta-Feng correspondingly (all items). Additionally, F1@5 and F1@10 are used as evaluation metrics on Ta-Feng dataset. For SPR dataset, the Kaggle challenge and MAP@7 are used for evaluation. Since the Kaggle submission only provides MAP@7 on the test set, this is the only metric reported for this dataset.

The following baseline methods are adopted for comparison: FMC which applies Markov chain on the factorized item transition matrix; FPMC which combines matrix factorization and factorized first-order Markov chains such that users' long-term preferences and item to item interactions can be captured; and SASRec which is a self-attention-based model for sequential recommendations. The model takes user action sequences as inputs and applies self-attention on the time domain to capture user action patterns to predict the next item. For a fair comparison, multi-heads are used to enhance performance. Additional baseline models include BERT4Rec that uses bidirectional self-attention to model user action sequences with adopted Cloze objective to sequential recommendations; DREAM that is a RNN-based model, in which a basket representation is aggregated by items' embedding through a pooling operation—it uses the latest basket representation to generate the next basket items; Beacon that is a RNN-based model that encodes the basket sequences while considering intra-basket (items in a basket) interactions; FDSA+ that is an extension to FDSA method, in which the vanilla attention is used to basket items at each time step and the loss function is updated in a similar manner as loss module 260.

For all the baseline methods, if they are facing the cold-start problem (e.g., users don't have any interaction history), the recommendation list is provided to these users based on the popularity items in the dataset. Since the original SASRec and BERT4Rec can not handle basket item sequences by design, additional data preparation may be conducted for these models. Each basket item sequence is flattened except the last basket, and then the last basket items are used as labels to generate training samples for each user.

AdamOptimizer is used to update the network with moment estimates $\beta 1=0.9$ and $\beta 2=0.999$. The self-attention layers are tuned from $\{1, 2, 4\}$ and head number on each attention block from $\{1, 2, 4, 6\}$. Maximum sequence lengths are set as 12, 16 and 30 in EPR, SPR and Ta-Feng datasets correspondingly. All the models are trained from scratch on a single NVIDIA Tesla K80 with batch size 256.

FIG. 8 provides a table showing the overall results comparing with seven baseline approaches, according to one embodiment described herein. The recommendation module 130 described herein outperforms all the baselines significantly on all the metrics. The relative percentage improvements range from 3.92% to 29.63%. This demonstrates the effectiveness of recommendation module 130. Among the baseline approaches, the approaches developed for next basket recommendation (DREAM, Beacon) outperform the ones for general sequence recommendation (FMC, FPMC, SASRec, Bert4Rec). FDSA+ performs best among baseline on EPR and SPR datasets while Beacon performs the best on Ta-Feng dataset. The main reason is that FDSA+ leverages the attributes information where EPR and SPR has a larger number of attributes compared to Ta-Feng. For SPR dataset, the top-ranking model in Kaggle challenge achieves 0.0314 in MAP@7. However, it applies heavy hand-craft feature engineering to come up with over 100 features (according to the Kaggle forum), which are time-consuming and overly specific to the dataset. It also ensembles multiple classifiers to boost performance. All these tricks can be applied on recommendation module 130.

To understand the impact of different components 231a-b, 232a-b, 233, 234 and 235 in the recommendation module 130, detailed ablation study is conducted using EPR dataset. To understand the impact of different components, detailed ablation study is conducted using EPR dataset in FIG. 9.

FIG. 10 provides a visualization view of average time-level and intra-attribute attention weights on SPR dataset. To gain insights into how attention captures meaningful patterns, the time-level attention weights and intra-attribute attention weights on sampled sequences from SPR dataset in FIG. 10. Four representative heat maps are shown with different layers and heads given an input sequence, where (a) and (b) are attention weights from two different layers (layer 1 and 4) of time level basket attention, and (c) and (d) are from two different heads of the first intra-attribute layer. In (a) and (b), x axis is position index of a basket sequence and y axis is time step. For example, in the 16th row, the time level attention module considers baskets with position index up to 16th month. From (a) and (b), it is shown that attention varies over different layers. While the weights in layer 4 focuses more on recent items, the weights in layer 1 attends more evenly to all previous histories. This shows the benefits of stacking more layers for capturing different temporal patterns. In (c) and (d), each grid in the figure represents an interaction between two input features. From (c) and (d), it is observed that the attention weights vary over different heads and the module captures meaningful feature interactions. For example in (c), the position (11, 1) (marked by a red square) corresponding to interacted feature value <"Foreigner index": NO, "Customer's Country residence": ES>, which makes sense since the bank is based in Spain, a customer who live in Spain indeed is not a foreigner. In (d), the position (9, 5) corresponds to interacted feature value <"Customer relation type": active, "New customer Index": 1>. This also meaningful because new customers and active customers are often high correlated. These observations illustrate the usefulness of multi-head attention.

Some examples of computing devices, such as computing device 200 may include non-transitory, tangible, machine readable media that include executable code that when run by one or more processors (e.g., processor 210) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for next basket recommendation using dynamic attributes of items, the system comprising:
    a communication interface receiving a basket of items that a user has interacted with and dynamic attributes associated with the user;
    a memory storing a plurality of processor-executable instructions; and
    one or more hardware processors reading and executing the plurality of processor-executable instructions to:
    encode, by an input encoder a basket item sequence indicating the basket of items into a first dense representation vector, and a dynamic attribute sequence indicating the dynamic attributes into a second dense representation vector;
    apply self-attention, by a time-level attention module implemented through at least a first neural network, to the first dense representation vector resulting in a first time-level attention matrix indicating a time-level sequential pattern of the basket items, and to the second dense representation vector resulting in a second time-level attention matrix indicating a time-level sequential pattern of the dynamic attributes of the user;
    apply attention, by an intra-basket attention module, to the first time-level attention matrix resulting in a basket item attention matrix indicating feature interaction among the basket of items;
    apply attention, by an intra-attribute attention module, to the second time-level attention matrix resulting in an attribute attention matrix indicating interactions among the dynamic attributes; and
    generate, by a prediction module a predicted set of basket items for a next time step based on the basket item attention matrix and the attribute attention matrix.

2. The system of claim 1, wherein the input encoder is configured to encode each multi-hot representation vector corresponding to each basket item in the basket item sequence or each attribute in the dynamic attribute sequence into a basket item latent representation, or an attribute latent representation, respectively, and
    wherein the attribute latent representation corresponds to a categorial attribute or a numerical attribute.

3. The system of claim 2, wherein the input encoder is further configured to:
    generate a positional embedding vector and a month embedding vector; and
    generate a basket representation, or a categorical attribute representation and a numerical attribute representation by adding the positional embedding vector and the month embedding vector to the basket item latent representation, or the attribute latent representation.

4. The system of claim 1, wherein the input encoder is configured to perform time-aware padding operation on the basket item sequence or the dynamic attribute sequence by:
    padding zeros into empty positions in the basket item sequence or the dynamic attribute sequence when a corresponding sequence length is less than a pre-set maximum sequence length.

5. The system of claim 1, wherein the time-level attention module comprises one or more stacked multi-head self-attention blocks (MHSABs).

6. The system of claim 1, wherein a first MHSAB from the time-level attention module is configured to:
    project a basket representation, a categorical attribute representation or a numerical attribute representation from the input encoder into a query, a key and a value; and
    concatenate multiple heads from the projection.

7. The system of claim 6, wherein the first MHSAB further feeds the concatenated multiple heads to a layer normalization and a two-layer fully connected layers with ReLu activation.

8. The system of claim 1, wherein the intra-basket self-attention module or the intra-basket self-attention module includes a stack of multiple MHSAB s.

9. The system of claim 1, wherein the prediction module comprises a feedforward neural network, is further configured to:
    concatenate the basket item attention matrix from the intra-basket attention module and the attribute attention matrix from the intra-attribute attention module; and
    generate, by the feedforward neural network, a recommendation score for each item based on the concatenated matrices.

10. The system of claim 9, further comprising:
    a loss computation module configured to compute a binary cross-entropy loss based on a sigmoid function of the recommendation score.

11. A method for next basket recommendation using dynamic attributes of items, the method comprising:
    Receiving, via a communication interface, a basket of items that a user has interacted with and dynamic attributes associated with the user
    encoding, by an input encoder, a basket item sequence indicating the basket of items into a first dense representation vector, and a dynamic attribute sequence indicating the dynamic attributes into a second dense representation vector;
    applying self-attention, by a time-level attention module implemented through at least a first neural network, to the first dense representation vector resulting in a first time-level attention matrix indicating a time-level sequential pattern of the basket items, and to the second dense representation vector resulting in a second time-level attention matrix indicating a time-level sequential pattern of the dynamic attributes of the user, a time-level attention matrix indicating a time-level sequential pattern of the dynamic attributes of the user and the basket of items based on the dense representation vector;

applying attention to the first time-level attention matrix resulting in a basket item attention matrix indicating feature interaction among the basket of items a basket item attention matrix indicating feature interaction among the basket of items based on the time-level attention matrix;

applying attention to the second time-level attention matrix resulting in an attribute attention matrix indicating interactions among the dynamic attributes; and generating a predicted set of basket items for a next time step based on the basket item attention matrix and the attribute attention matrix.

12. The method of claim 11, wherein the encoding the basket item sequence or the dynamic attribute sequence further comprises:

encoding each multi-hot representation vector corresponding to each basket item in the basket item sequence or each attribute in the dynamic attribute sequence into a basket item latent representation, or an attribute latent representation, respectively, and wherein the attribute latent representation corresponds to a categorial attribute or a numerical attribute.

13. The method of claim 12, further comprising:

generating a positional embedding vector and a month embedding vector; and generating a basket representation, or a categorical attribute representation and a numerical attribute representation by adding the positional embedding vector and the month embedding vector to the basket item latent representation, or the attribute latent representation.

14. The method of claim 12, further comprising performing time-aware padding operation on the basket item sequence or the dynamic attribute sequence by:

padding zeros into empty positions in the basket item sequence or the dynamic attribute sequence when a corresponding sequence length is less than a pre-set maximum sequence length.

15. The method of claim 11, wherein the generating the basket item attention matrix or the attribute attention matrix comprises:

project a basket representation, a categorical attribute representation or a numerical attribute representation from the input encoder into a query, a key and a value; and concatenate multiple heads from the projection; and feeding the concatenated multiple heads to a layer normalization and a two-layer fully connected layers with ReLu activation.

16. The method of claim 11, wherein the generating the predicted set of basket items comprises:

concatenating the basket item attention matrix from the intra-basket attention module and the attribute attention matrix from the intra-attribute attention module; and generating, by the feedforward neural network, a recommendation score for each item based on the concatenated matrices.

17. The method of claim 16, further comprising:

computing a binary cross-entropy loss based on a sigmoid function of the recommendation score.

* * * * *